US007581675B2

(12) United States Patent
McCormick

(10) Patent No.: US 7,581,675 B2
(45) Date of Patent: Sep. 1, 2009

(54) CREDIT CARD FORM WITH IMPROVED TRUNCATED NUMBERS

(75) Inventor: Joseph A. McCormick, Jefferson City, MO (US)

(73) Assignee: General Credit Forms, Inc., Earth City, MO (US)

( * ) Notice: Subject to any disclaimer, the term of this patent is extended or adjusted under 35 U.S.C. 154(b) by 63 days.

(21) Appl. No.: 11/524,454

(22) Filed: Sep. 20, 2006

(65) Prior Publication Data

US 2007/0267483 A1 Nov. 22, 2007

Related U.S. Application Data

(60) Provisional application No. 60/800,764, filed on May 16, 2006.

(51) Int. Cl.
*G06K 5/00* (2006.01)

(52) U.S. Cl. ........................ 235/380; 235/487; 235/375

(58) Field of Classification Search ................. 235/380, 235/487, 375, 485; 705/24; 283/72
See application file for complete search history.

(56) References Cited

U.S. PATENT DOCUMENTS

| | | | | |
|---|---|---|---|---|
| 4,846,502 | A * | 7/1989 | Chang et al. | 283/57 |
| 5,088,962 | A * | 2/1992 | McCartney | 462/18 |
| 5,880,062 | A * | 3/1999 | Sanders et al. | 503/201 |
| 7,225,978 | B2 * | 6/2007 | Watson | 235/380 |
| 2004/0050269 | A1 * | 3/2004 | Adamczyk et al. | 101/150 |

OTHER PUBLICATIONS

"Account Truncation With Manual Receipts, Product: Truncating Sales Drafts, Company: CardWare International," p. 105 of *The Green Sheet*, Issue 05:11:02, dated Nov. 28, 2005 (The Green Sheet Cover Page and Table of Contents also included), three total pages.

* cited by examiner

*Primary Examiner*—Edwyn Labaze
(74) *Attorney, Agent, or Firm*—Marshall, Gerstein & Borun LLP

(57) ABSTRACT

A multiple-ply credit card form and a method of imprinting a multiple-ply credit card form are provided. The credit card form may include at least a customer copy ply and a merchant copy ply. The merchant copy ply may include an area for imprinting a credit card number The customer copy ply may include a truncated area containing a desensitized area and a blind embossed area.

11 Claims, 6 Drawing Sheets

CREDIT CARD FORM WITH IMPROVED TRUNCATED NUMBERS

This application claims the benefit of U.S. Provisional Patent Application Ser. No. 60/800,764, entitled "Credit Card Form With Improved Truncated Numbers," filed on May 16, 2006.

BACKGROUND OF THE INVENTION

1. Field of the Disclosure

The present disclosure is generally directed to credit card forms, and more particularly, to credit card forms with the capability of minimizing the circulation of credit card information, such as, for example, card numbers.

2. Description of Related Art

Federal law in the United States mandates that credit card and/or debit card P.O.S. (point-of-sale) roll receipts shall print no more than the last five digits of the credit card/debit card number nor print the expiration date on the customer copy ply. Accordingly, when a customer signs a credit card roll receipt, the first twelve digits of the sixteen total digits of the credit card number on the credit card do not print out. Instead, typically only zeros or "x's" are printed instead of the complete credit card number.

This law only applies to electronically printed roll receipts, and does not apply to transactions in which the sole means of recording a credit card/debit card account number is by handwriting or by an imprint or copy of the card, via a manual imprinting machine. However, to help prevent credit card fraud, it is still desirable to have such security measures for credit card forms that have manually imprinted credit card information on said forms.

Prior attempts to achieve such security measures on credit card forms include using a desensitizing material (e.g., desensitizing ink) applied to a portion of a form that is imprinted with a copy of credit card information, so that the credit card number is truncated on the copy and therefore the entirety of the credit card information is not shown on a copy of the form (e.g., the expiration date is not shown, and only the last five or less digits of the credit card number are shown on the customer's copy). Although the desensitizing material may eliminate the ease of reading any printed matter wherever the desensitizing material is applied, it will not eliminate the physical embossing of the credit card information by virtue of the imprinting process that creates permanent deformation of the paper of the form, for example, when the form is imprinted using a manual imprinting machine. As a result, the credit card information, including the full credit card number may be obtained by viewing the back side of the form and/or by making a rubbing on the form, for example, using a charcoal or a graphite pencil.

Accordingly, there is a need for an improved way of truncating credit card information for security purposes on handwritten or manually imprinted credit card forms.

SUMMARY

In accordance with one aspect of the present disclosure, a method and apparatus for blocking out credit card information on credit card forms is provided. By using desensitizing material in addition to physically blind embossing the desensitized area with a pattern that may be a combination of random characters (e.g., numbers, symbols and letters in an irregular pattern), credit card information may be properly masked such that it will not be deciphered and therefore will achieve a higher level of security and reduce the risk of credit card fraud. By printing such a blind embossed pattern in addition to providing desensitized areas, the credit card information is truly truncated and it is virtually impossible for an unscrupulous person to view, scan, lift, etc., credit card information from this truncated credit card form.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
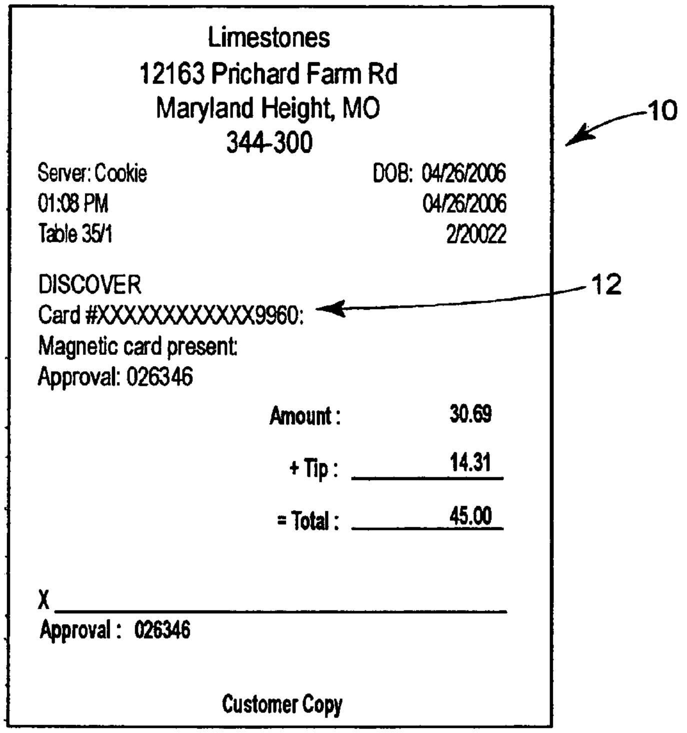
FIG. 1 shows an example of a typical roll receipt showing credit card number information truncated such that only the last four digits of the credit card number appear on the roll receipt.

With reference initially to FIG. 1, an exemplary roll receipt 10 is shown, with a truncated credit card number at 12, in accordance with federal law in order to protect customer credit card information from being obtained by an unauthorized person or entity. This truncation of the credit card number is fairly easy to accomplish for roll receipts, since they are computer-generated and therefore easy to customize. However, for credit card forms that are used in conjunction with a credit card imprinting machine, the truncation can be more difficult.

Figure 2:
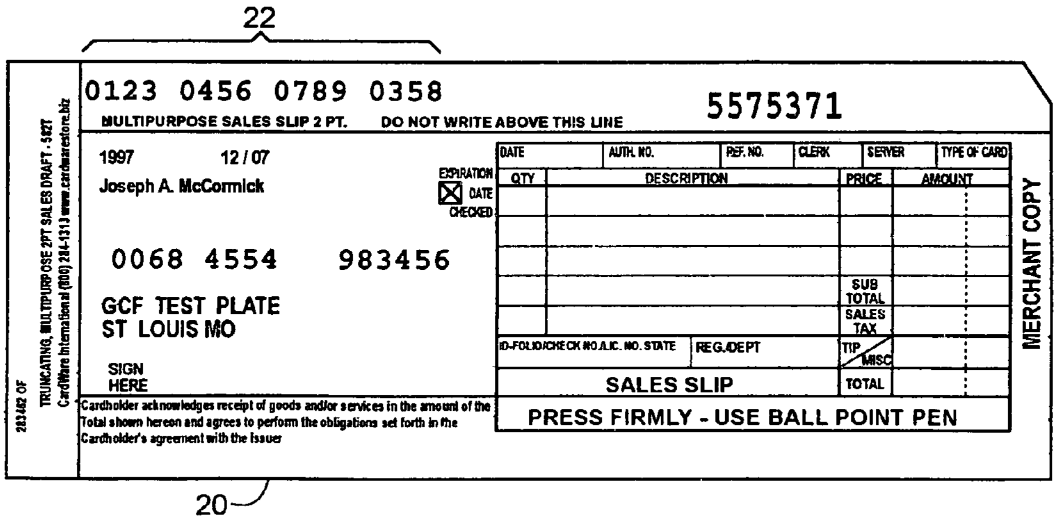
FIG. 2 depicts a merchant copy ply of a multiple-ply credit card form according to the related art.
Figure 3:
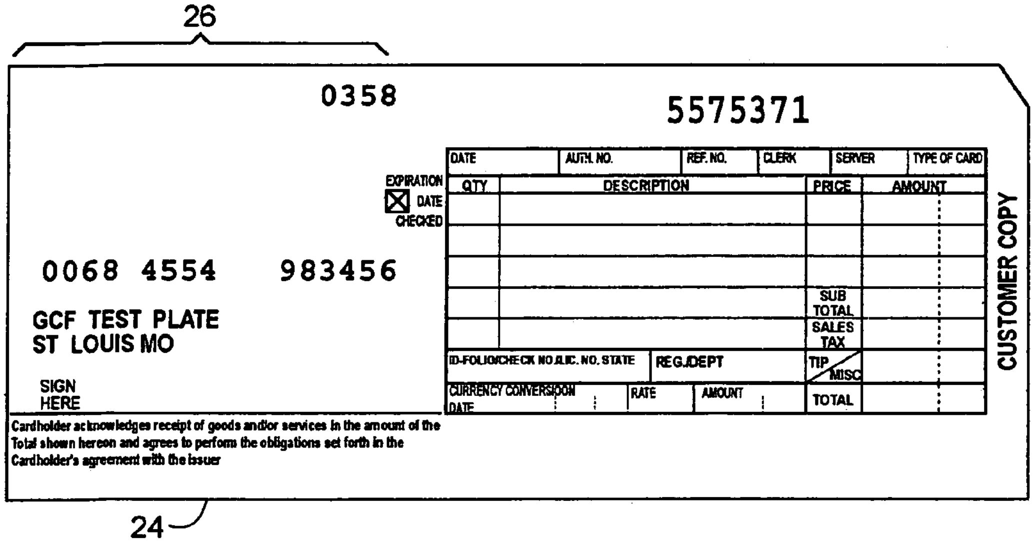
FIG. 3 depicts a front side of a customer copy ply of a desensitized credit card form that may be used in connection with the merchant copy ply of the credit card form of FIG. 1.

FIG. 2 depicts a merchant copy ply 20 of a multiple-ply credit card form that has been imprinted with a sixteen-digit credit card number 22. FIG. 3 depicts the front side of customer copy ply 24 of a multiple-ply credit card form that may be placed directly behind the merchant copy ply 20 as is typical for multiple-ply credit card forms, such as, for example, credit card forms that are used in manual card imprinting machines. As indicated at 26, a portion of the credit card number is obliterated by a desensitized area of the customer copy ply 24 of the multiple-ply credit card form.

Figure 4:
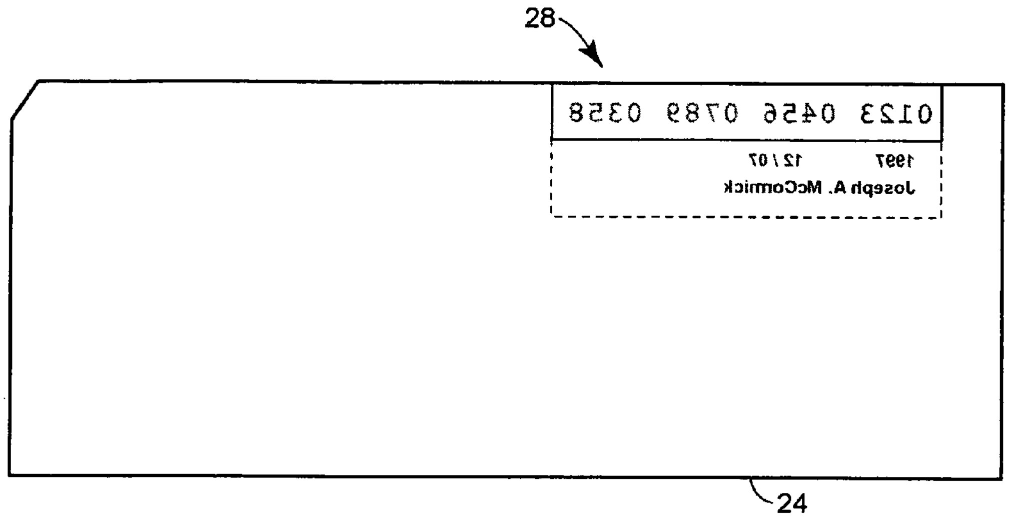
FIG. 4 depicts a back side of a customer copy ply of FIG. 3 showing that the digits meant to be truncated by desensitizing an area of the front side of the customer copy ply of FIG. 3 may be visible on the back side of the customer copy ply.

However, as shown in FIG. 4, which depicts the back side of the customer copy ply 24 depicted in FIG. 3, the entire credit card number, including all sixteen digits, may be fully visible (on the back and/or front side of the customer copy 24) as indicated at 28, due to the physical deformation of the paper of the customer copy ply 24 from embossing of the digits from the credit card on the customer copy ply 24.

Figure 5:
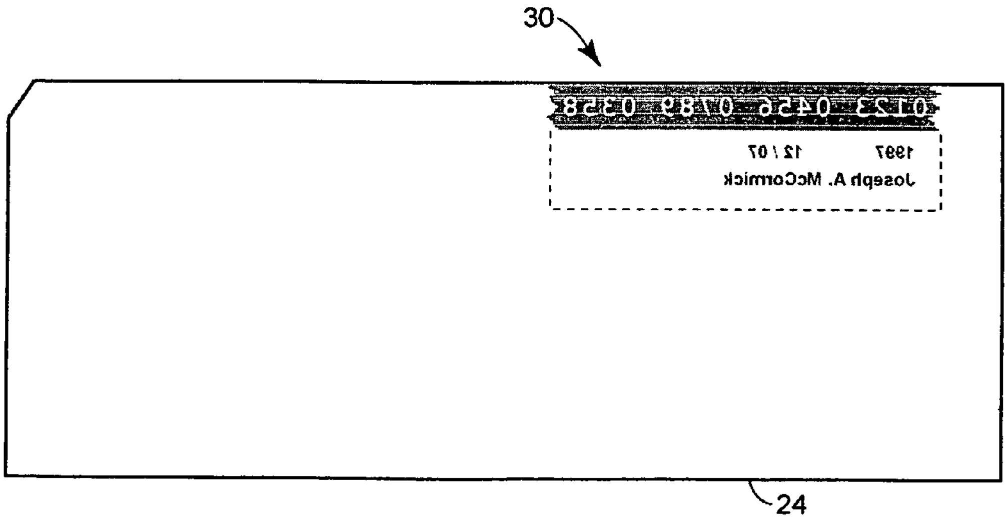
FIG. 5 depicts a back side of a customer copy ply of a credit card form, similar to that of FIG. 4, showing a rubbing that reveals credit card number information that is meant to be truncated by the desensitized area on the front of the customer copy ply of the credit card form.

FIG. 5 depicts a similar back side view of a customer copy ply 24, showing a rubbing of a graphite pencil on the area of the form on which credit card number is embossed, thereby revealing the entire credit card number, as indicated at 30. It should be noted that the embossed number may also be visible on the front side using a similar graphite pencil rubbing technique.

Figure 6:
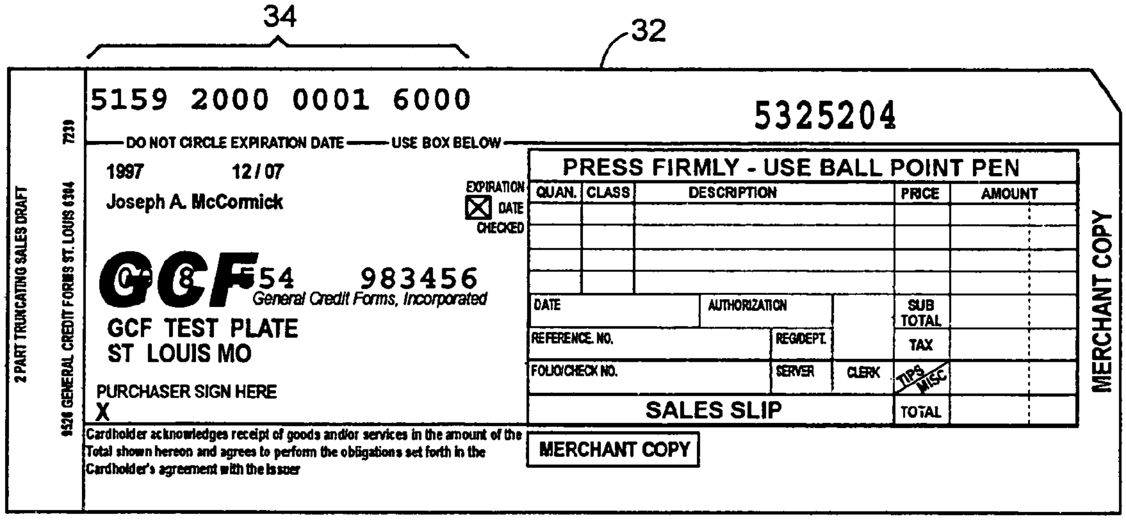
FIG. 6 depicts the front side of a merchant copy ply of a multiple-ply credit card form in accordance with this disclosure.
Figure 7:
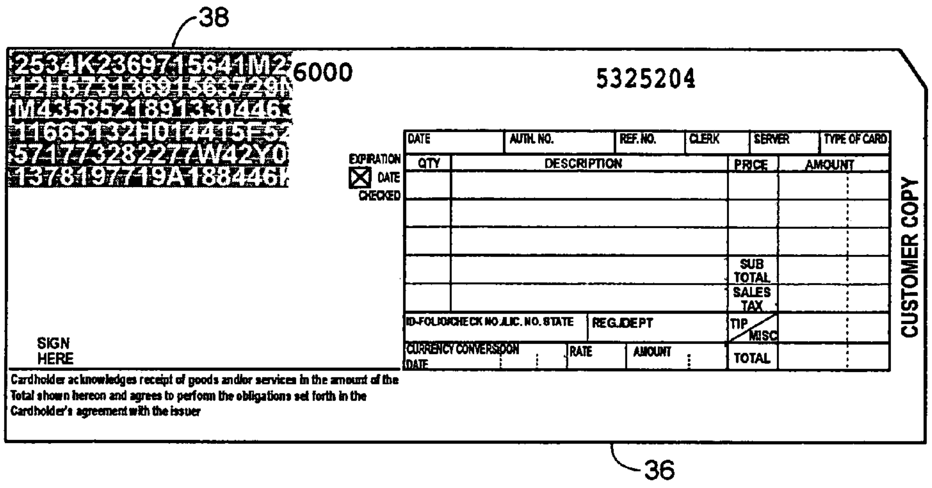
FIG. 7 depicts the front side of a customer copy ply of a credit card form with rubbing by a pencil to show the random blind embossing of characters and numbers in order to obliterate any embossed characters from the actual credit card.

FIG. 6 depicts a merchant copy ply 32 of an improved multiple-ply credit card form in accordance with this disclosure, with a sixteen digit credit card number imprinted thereon, as indicated at 34. FIG. 7 depicts a customer copy ply 36 of a multiple-ply credit card form (that may be the second ply attached directly behind the merchant copy ply 32) with a rubbing showing a truncated area 38 that is blind embossed and desensitized. The truncated area 38 may include a random array of blind embossed characters (that may include numbers and/or letters) in order to obliterate any credit card information that is not desired to be decipherable on the customer copy ply 36. The blind embossed characters may overlap, if desired, to further obfuscate the credit card information that is not desired to be decipherable on the customer copy ply 36.

Figure 8:
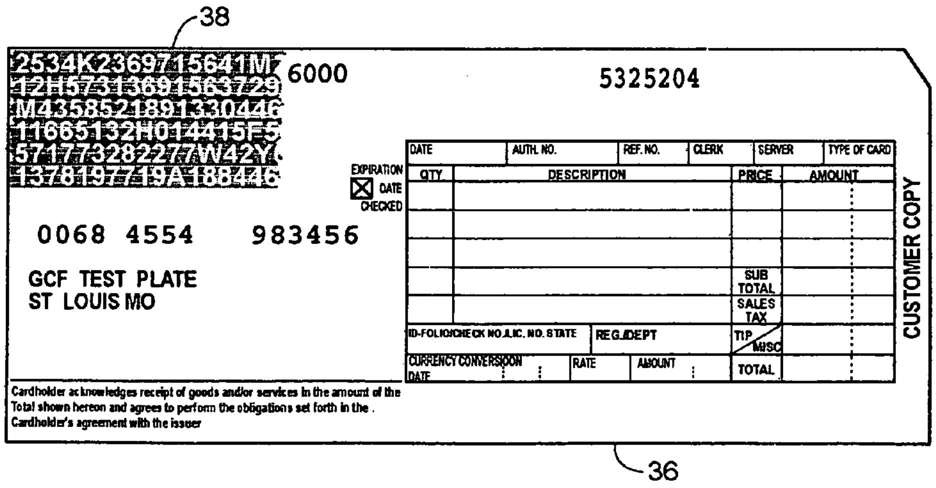
FIG. 8 depicts the front side of a customer copy ply of the multiple-ply credit card form of FIG. 7, after being imprinted with credit card information, also with rubbing by a pencil to show the random blind embossing of characters and numbers in order to obliterate any embossed characters from the actual credit card.

FIG. 8 depicts the customer copy ply 36 of FIG. 7, after being imprinted with credit card information, and it can be seen that the full credit card number (that is printed on the merchant copy ply 32 of FIG. 6) cannot be deciphered, as truncated digits are not visible even after rubbing the truncated area 38 with a graphite pencil, due to the random array of embossed characters serving to render any portion of the credit card number in the truncated area 38 indecipherable.

Figure 9:
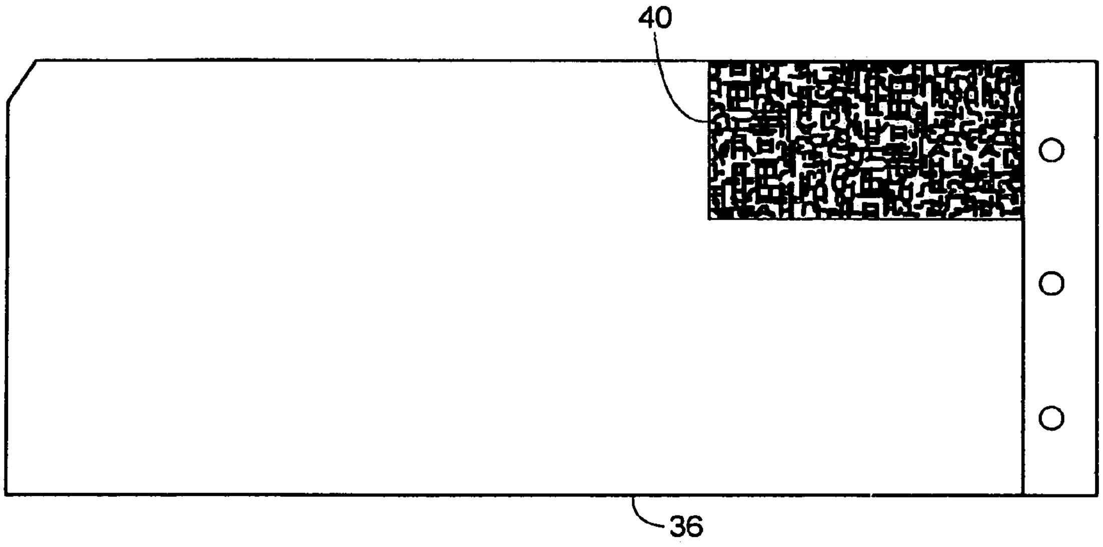
FIG. 9 depicts a back side of the customer copy ply of the multiple-ply credit card form of FIGS. 7 and 8, showing that additional random printed characters may be provided to further obliterate any image of actual credit card number information that may otherwise be visible on the back side of the customer copy ply.

FIG. 9 depicts the back side of the customer copy ply 36 of FIGS. 7 and 8, showing that additional printed random characters 40 may be provided on the portion of the back side that coincides with the truncated area 38. The additional printed random characters 40 may be printed on the back side of the customer copy ply 36, to further obliterate any image of actual credit card number information that may otherwise appear on the back side of the customer copy ply 36 in the truncated area 38.

As will be understood by those of ordinary skill in the art, the improved credit card form configurations and methods disclosed herein will prevent fraudulent access to credit card account information even by viewing and/or creating a rubbing of the back side of a customer copy ply of a multiple-ply credit card form. This provides enhanced fraud protection for the credit card user because credit card account information is not fully reproduced on the customer copy ply of the multiple-ply credit card form Although certain credit card forms and methods have been described herein in accordance with the teachings of the present disclosure, the scope of coverage of this patent is not limited thereto. On the contrary, this patent covers all embodiments of the teachings of the disclosure that fairly fall within the scope of permissible equivalent

What is claimed is:

1. A multiple-ply credit card form comprising:

at least a customer copy ply and a merchant copy ply;

the merchant copy ply having an area upon which credit card information is printed;

the customer copy ply including a truncated area containing a desensitized area and a blind embossed area, the blind embossed area including a physical deformation of the customer copy ply;

wherein the blind embossed area and the desensitized area prevent a legible copy of the credit card information from being completely reproduced on the customer copy ply of the credit card form, and the desensitized area and the blind embossed area substantially completely overlay one another on the customer copy ply of the credit card form.

2. The multiple-ply credit card form of claim 1, further including a plurality of printed random characters provided on a back side of the customer copy ply of the credit card form.

3. The multiple-ply credit card form of claim 2, wherein the printed random characters are provided on a portion of the back side of the customer copy ply of the credit card form that coincides with the blind embossed and desensitized area of the credit card form.

4. The multiple-ply credit card form of claim 1, wherein the blind area includes a plurality of random blind embossed characters.

5. The multiple-ply credit card form of claim 1, wherein the blind embossed area includes a plurality of overlapping blind embossed characters.

6. A method of imprinting a multiple-ply credit card form, the credit card form including at least a merchant copy ply and a customer copy ply, the method including:

providing an area on the merchant copy ply for imprinting credit card information;

providing an area on the customer copy ply for imprinting credit card information;

providing a desensitized area on a portion of the area on the customer copy ply for imprinting credit card information; and embossing blind characters on the desensitized area on the customer copy ply for imprinting credit card information, the blind embossing including physically deforming the customer copy ply.

7. The method of claim 6, further including providing a plurality of printed random characters on a back side of the customer copy ply of the credit card form.

8. The method of claim 6, wherein printed random characters are provided on a portion of the back side of the customer copy ply of the credit card form that coincides with the desensitized area of the credit card form.

9. The method of claim 6, wherein the desensitized area includes a random array of blind embossed characters.

10. The method of claim 6, wherein the desensitized area includes overlapping blind embossed characters.

11. A multiple-ply credit card form comprising:

at least a customer copy ply and a merchant copy ply;

the merchant copy ply having an area upon which credit card information is printed;

the customer copy ply including a truncated area containing a desensitized area and a blind embossed area, the blind embossed area includes a physical deformation of the customer copy ply;

wherein the blind embossed area and the desensitized area are co-located and prevent a legible copy of the credit card information from being completely reproduced on the customer copy ply of the credit card form.

* * * * *